US012801545B2

(12) United States Patent
Venkatesh et al.

(10) Patent No.: US 12,801,545 B2
(45) Date of Patent: Nov. 17, 2026

(54) SYSTEMS AND METHODS OF IMPROVING STORAGE PERFORMANCE WITH USER-CENTRIC DIRECT MEMORY ACCESS

(71) Applicant: Dell Products L.P., Round Rock, TX (US)

(72) Inventors: Karthik Venkatesh, Bangalore (IN); Akash Lokesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/643,102

(22) Filed: Apr. 23, 2024

(65) Prior Publication Data

US 2025/0328481 A1 Oct. 23, 2025

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ............................... G06F 3/0685; G06F 13/28
See application file for complete search history.

(56) References Cited

U.S. PATENT DOCUMENTS 10,346,360 B1 * 7/2019 Basov .................... G06F 16/182
RE49,591 E * 7/2023 Kaushik ............ H04W 52/0251 713/320
11,940,924 B2 * 3/2024 Kawahara ........... G06F 12/0891
12,068,948 B2 * 8/2024 Langer .................. H04L 45/306
2011/0010480 A1 * 1/2011 Auernhammer ........ G06F 13/28 710/308
2015/0089132 A1 * 3/2015 Madhusudana ....... G06F 3/0685 711/114
2017/0286284 A1 * 10/2017 Risinger ............... G06F 3/0644
2022/0222075 A1 * 7/2022 Pawlowski ......... G06F 9/30032

* cited by examiner

*Primary Examiner* — Getente A Yimer
(74) *Attorney, Agent, or Firm* — Daly, Crowley, Mofford & Durkee, LLP

(57) ABSTRACT

A user-centric direct memory access system receives Input/Output requests and categorizes the requests according to a classification, such as a request size. The request is stored to a statically pinned memory if the request is categorized as a small request, a pinned memory pool if the request is categorized as a medium sized request, and a dynamically allocated memory if the request is a classified as a large request. The statically pinned memory includes three memory block lists, including two block lists for write requests and one block list for read requests. Memory pinned in the dynamically allocated memory may be released upon completion of a request.

16 Claims, 7 Drawing Sheets

SYSTEMS AND METHODS OF IMPROVING STORAGE PERFORMANCE WITH USER-CENTRIC DIRECT MEMORY ACCESS

BACKGROUND

Storage arrays may often experience bursts of incoming and outgoing requests. When a significant number of requests, including input/output (I/O) requests, occur within a short time span, system processing and storage resources can be strained and operational bottlenecks may occur, increasing latency and degrading input/output per second (IOPS). Non-volatile memory express (NVMe) solid state drives (SSD) are known to have superior I/O performance in contemporary computer systems. NVMe SSD devices rely on Direct Memory Access (DMA) as one mechanism for facilitating direct I/O operations. DMA allows some hardware subsystems to access main system memory independently of the central processing unit (CPU). DMA also allows for copying or moving data within memory (i.e., memory to memory). DMA can offload expensive memory operations, including large copies or scatter-gather operations, from the CPU to a dedicated DMA offload engine.

Despite the efficiency of NVMe SSD devices, the protracted I/O stack introduces a bottleneck that hampers the devices' full potential. Existing user-level DMA introduces unwarranted overhead in pinning memory from the user space and lacks adaptability to varying I/O requests with distinct data sizes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method may include receiving an input/output (I/O) request and categorizing the I/O request according to a classification. If the I/O request is categorized into a first classification, the I/O request may be stored to a statically pinned memory. If the I/O request is categorized into a second classification, the I/O request may be stored in a pinned memory pool. If the I/O request is categorized into a third classification, the I/O request may be stored in a dynamically allocated memory.

The method may include, alone or in combination, one or more of the following features. The I/O request may comprise a direct memory access operation. The classification may comprise a request size, the first classification may include a first request size, the second classification may include a second request size, and the third classification may comprise a third request size. The first request size may comprise less than four kilobytes. The second request size may comprise greater than or equal to four kilobytes and less than or equal to four megabytes. The third request size may comprise greater than four megabytes. At least one block list in the statically pinned memory may be designated for I/O read requests. At least two block lists in the statically pinned memory may be designated for I/O write requests. The I/O write requests may be stored in a first of the at least two block lists in the statically pinned memory until a first capacity is reached and the I/O write requests may be stored in a second of the at least two block lists in the statically pinned memory after the first capacity is reached. The pinned memory pool may comprise a scatter/gather list configuration. Pinned memory blocks in the dynamically allocated memory may be released upon completion of the I/O request.

According to another aspect, a system may include a memory and at least one processor that is operatively coupled to the memory. The at least one processor may be configured to perform the operations of receiving an input/output (I/O) request, and categorizing the I/O request according to a classification. If the I/O request is categorized into a first classification, the I/O request may be stored to a statically pinned memory. If the I/O request is categorized into a second classification, the I/O request may be stored in a pinned memory pool. If the I/O request is categorized into a third classification, the I/O request may be stored in a dynamically allocated memory.

The system may include, alone or in combination, one or more of the following features. The I/O request may comprise a direct memory access operation. The classification may comprise a request size, the first classification may include a first request size, the second classification may include a second request size, and the third classification may comprise a third request size. The first request size may comprise less than four kilobytes. The second request size may comprise greater than or equal to four kilobytes and less than or equal to four megabytes. The third request size may comprise greater than four megabytes. At least one block list in the statically pinned memory may be designated for I/O read requests. At least two block lists in the statically pinned memory may be designated for I/O write requests. The I/O write requests may be stored in a first of the at least two block lists in the statically pinned memory until a first capacity is reached and the I/O write requests may be stored in a second of the at least two block lists in the statically pinned memory after the first capacity is reached. The pinned memory pool may comprise a scatter/gather list configuration. Pinned memory blocks in the dynamically allocated memory may be released upon completion of the I/O request.

According to another aspect, a non-transitory computer-readable medium may store one or more processor-executable instructions, which when executed by at least one processor cause the at least one processor to perform the operations of receiving an input/output (I/O) request and categorizing the I/O request according to a classification. If the I/O request is categorized into a first classification, the I/O request may be stored to a statically pinned memory. If the I/O request is categorized into a second classification, the I/O request may be stored in a pinned memory pool. If the I/O request is categorized into a third classification, the I/O request may be stored in a dynamically allocated memory.

BRIEF DESCRIPTION OF THE DRA WINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Aspects of the present disclosure provide a dynamically adaptive optimized data transfer user-centric DMA (UCDMA) system to accommodate diverse input/output (I/O) requests and alleviate the I/O software stack by amortizing per-request latency. The UCDMA system may incorporate a pinned memory pool to minimize overhead by reusing allocated and pinned memory blocks, eliminating the need for frequent pinning of new memory. Furthermore, the UCDMA system optimally links discrete pinned memory blocks through scatter/gather lists, thereby enhancing the utilization of the pinned memory pool. According to one aspect, the UDCMA system may be integrated into storage performance development kit (SPDK) framework libraries, or the like.

According to one aspect, the UCDMA system may receive I/O requests and categorize the requests according to a classification, such as a request size. The request may be stored to a statically pinned memory if the request is categorized as a small request, a pinned memory pool if the request is categorized as a medium sized request, and a dynamically allocated memory if the request is a classified as a large request. The statically pinned memory may include three memory block lists, including two block lists for write requests and one block list for read requests. Memory pinned in the dynamically allocated memory may be selectively released upon completion of a request.

Figure 1:
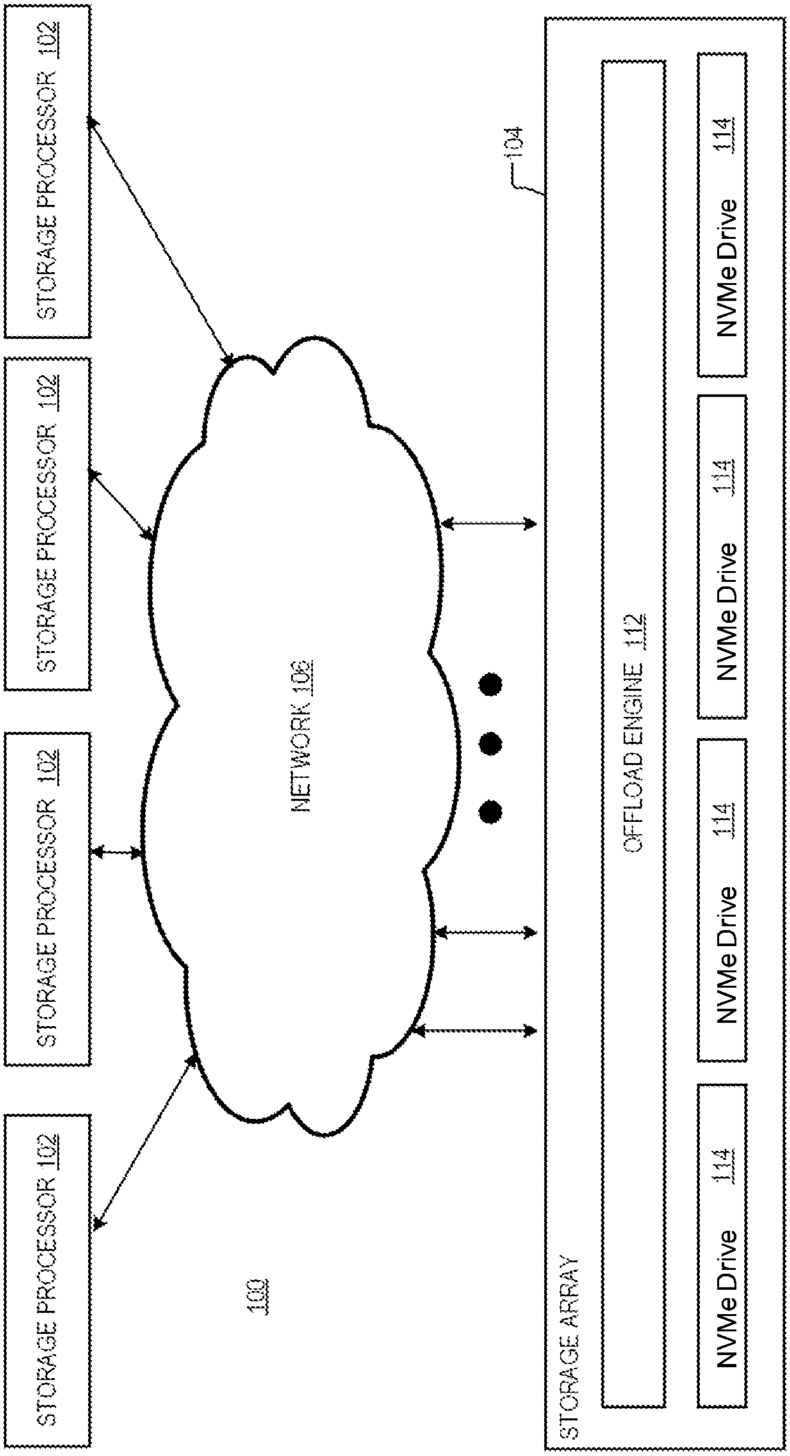
FIG. 1 is a diagram of an example of a storage array system, according to aspects of the disclosure.

FIG. 1 is a diagram of an example of a storage array system 100, according to aspects of the disclosure. As illustrated, the system 100 may include a plurality of storage processors 102, a network 106, and a storage array 104. The network 106 may include or be an InfiniBand network. The storage array 104 may include an offload engine 112 and a plurality of Non-Volatile Memory Express (NVMe) drives 114 (hereinafter "storage devices" 114). In operation, each of the storage processors 102 may receive write requests, cache the data requested to be written, and subsequently offload the cached data to the offload engine 112. The offload engine 112 may be configured to store the cached data permanently in the storage devices 114. Although, in the example of FIG. 1, network 106 is an InfiniBand network, it will be understood that alternative implementations are possible in which network 106 includes any suitable type of network, such as a local area network (LAN), a wide area network (WAN), the Internet, a mobile data network (e.g., a 5G network), etc. Although in the example of FIG. 1 each of the storage devices 114 is an NVMe drive, alternative implementations are possible in which one or more of the storage devices 114 is a hard disk, a Solid-State drive, and/or any other suitable type of storage device.

Figure 2:
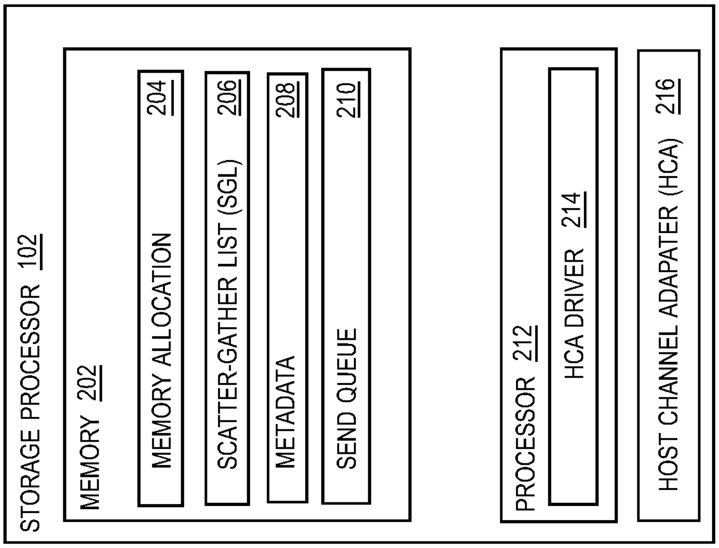
FIG. 2 is a diagram of an example of a storage processor, according to aspects of the present disclosure.

FIG. 2 is a diagram of an example of a storage processor 102, according to aspects of the disclosure. As illustrated, the storage processor 102 may include a memory 202, a processor 212, and a host channel adapter (HCA) 216. According to the present example, the HCA 216 may be an NVIDIA ConnectX-6™ HCA. The processor 212 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. The memory 202 may include any suitable type of volatile and/or non-volatile memory, such as a solid-state drive (SSD), a hard disk (HD), a random-access memory (RAM), a Synchronous Dynamic Random-Access Memory (SDRAM), etc. The HCA 216 may be a circuit board or integrated circuit adapter that connects the storage processor 102 to the network 106 and the storage array 104 (shown in FIG. 1).

The memory 202 may be configured with a memory allocation portion 204, a scatter-gather list (SGL) 206, metadata 208 and a send queue 210. While each of the components are shown in FIG. 2 as a part of the memory 202, one skilled in the art will recognize that any of the components may be located outside of the memory 202 and in other components, circuitry or other structures accessible by the storage processor 102.

According to one aspect, as described herein, the storage processor 102 may be configured to process incoming I/O requests according to an optimized data transfer policy with a UCDMA mechanism. The UCDMA mechanism, as described herein, may classify incoming requests according to their size, or other classifier, and write to global memory according to memory allocation portions 204 based on the classification.

The memory 202 may store an SGL 206 and metadata 208. An SGL is a data structure used in computer systems and I/O operations to efficiently transfer data between non-contiguous memory locations. It may be particularly useful when performing bulk data transfers or when data is scattered across multiple buffers or regions. In a scatter-gather list, each entry in the list may describe a specific memory buffer or region along with its associated length. Instead of requiring a single, contiguous block of memory for data transfer, the scatter-gather list may allow a storage processor (and/or an offload engine) to process data from or to multiple non-contiguous locations.

An SGL may include a plurality of entries with each entry corresponding to (or describing) a different contiguous region of memory 202 (or another memory). In some implementations, the entries may be chained, such that each entry (save for the last) may point to the next entry in the SGL 206. The respective contiguous memory region that may be described by (or corresponds to) each of the entries may include one or more data blocks. Each of the respective data blocks, in any contiguous memory region (that is described by or corresponds to any of entries) may be associated with a different respective integrity field. According to one aspect, the integrity field may be a T10-DIF or T10-DIX field. However, the present disclosure is not limited to any specific type of integrity field.

Metadata 208 may include a plurality of metadata portions. Each metadata portion may correspond to a different one of the data blocks that are part of the contiguous memory regions. Each metadata portion may include at least one of: (i) at least a partial indication of the memory location where the metadata portion's respective integrity field is stored, and (ii) an indication of one or more integrity operations that are required to be performed based on at least of the contents of the integrity field. In instances in which an integrity field and its corresponding data block are non-contiguous, the metadata 208 may include an indication of the location where the integrity field is stored. In instances in which an integrity field and its corresponding data block form one contiguous data chunk, the metadata 208 may indicate the bits in the chunk that are part of the integrity field. For instance, the metadata 208 may indicate that bits 0-50 in a chunk belong to user data and bits 51-64 in the chunk correspond to protection information that is useable for checking the integrity of the user data.

Memory 202 may be further configured to store a send queue 210. The send queue 210 may be an outbound queue that is configured to store descriptors (e.g., command capsules) that are being sent from the storage processor 102 to the offload engine 112. According to the present example, the send queue, 210 may be an InfiniBand send queue, however, the present disclosure is not limited thereto. The processor 212 may execute a driver 214 for the HCA 216. The driver may be configured to, at least in part, manage the send queue 210 as well as any other queues that are used by the storage processor 102 for the transmission of data via the HCA.

Figure 3:
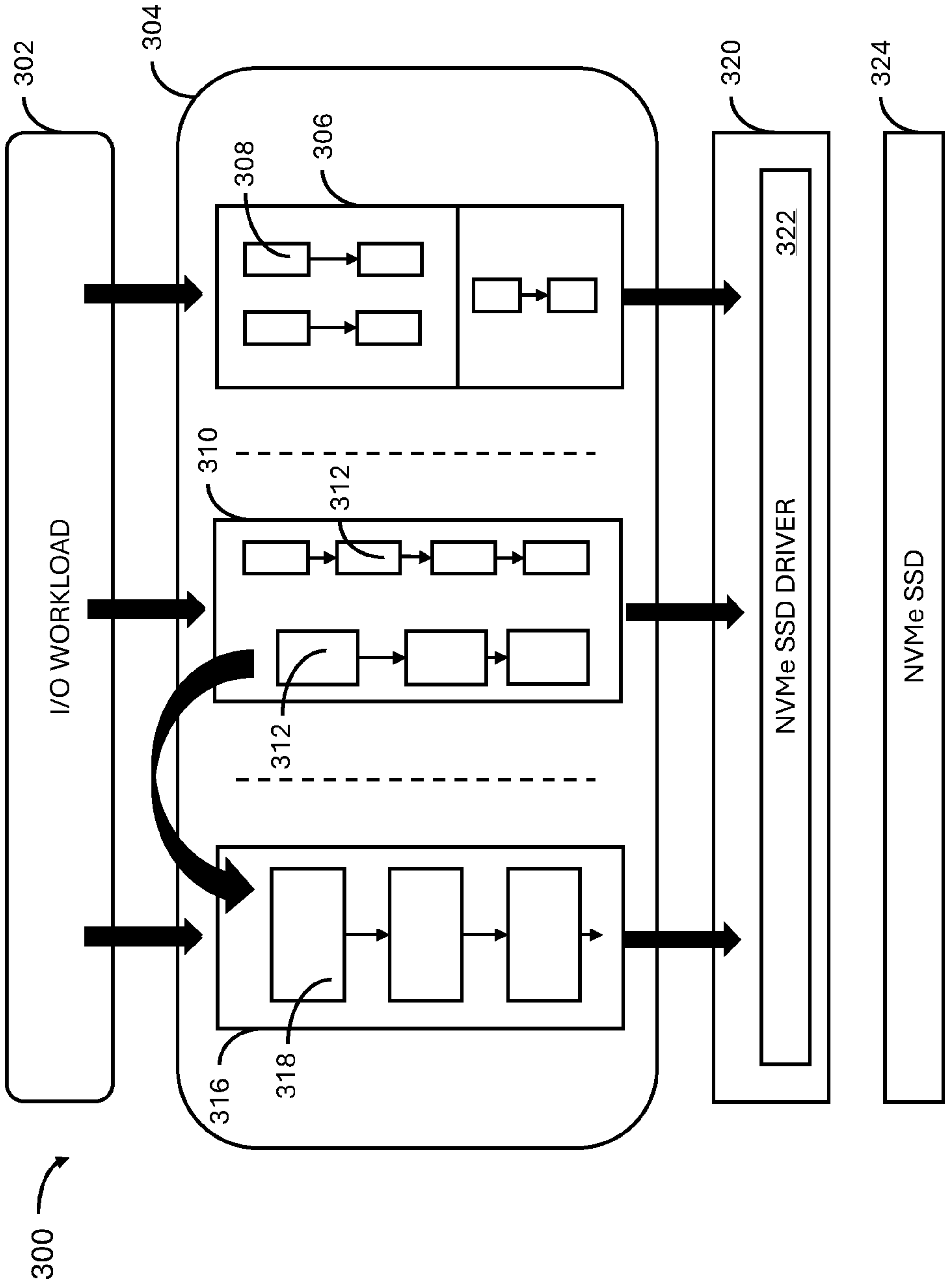
FIG. 3 is a block diagram of a user-centric direct memory access framework, according to aspects of the present disclosure.

FIG. 3 is a block diagram of a UCDMA framework 300, according to aspects of the present disclosure. According to one aspect, escalating demands placed on I/O systems by contemporary cloud computing workloads have led to the implementation of NVMe SSDs as a prominent storage solution. Despite hardware advancements in NVMe SSDs, the extended I/O software stack in operating systems diminishes their potential. For example, a Linux kernel may, in particular, pose a significant bottleneck due to context switching and interrupting. Known user-level methods attempt to mitigate the bottleneck by transferring a portion of the kernel I/O stack to the user space, however data-intensive scenarios may still present challenges.

DMA provides a large role in contemporary computer systems. DMA may empower applications within an operating system (OS) to autonomously transfer data between specific PCIe-based devices and the primary memory, eliminating the need for CPU involvement. In the absence of DMA, traditional I/O operations may monopolize the CPU throughout their life cycles, preventing it from executing other tasks. DMA may streamline this process by requiring the CPU only to initialize the data transfer parameters, such as direction, size, and location, allowing the CPU to engage in other concurrent tasks. DMA's capabilities may enhance the efficiency of asynchronous I/O requests, as the CPU is no longer compelled to await sluggish I/O data transfers.

User-centric DMA (UCDMA), in comparison to its kernel space counterpart, may offer a more lightweight mode of data transfer. UCDMA may enable users to access and control data for DMA transfers directly from the user space. Notably, NVMe SSDs can be accessed directly through User Space I/O (UIO) or Virtual Function I/O (VFIO) at the user level. Leveraging UIO and VFIO, users may implement user-level DMA by assigning a hardware device to a specific process, granting it the capability to operate and perform read/write operations on the device. However, UIO and VFIO encounter a challenge in ensuring the availability of physical memory during the DMA process. Known solutions may involve manually pinning the physical memory pages, rendering them immutable, albeit at the cost of potential I/O performance degradation, particularly in applications characterized by intensive I/O operations.

Returning now to FIG. 3, an I/O workload 302 may be considered one such collection of intensive I/O operations. I/O workload 302 may include a number of I/O requests received within a short period of time. Depending on the operational requirements of the system, the I/O workload 302 may include bursts of activity in which a high volume of requests is received within a short period of time. A UCDMA system 304 may receive and process requests in a manner to minimize initialization overhead and enhance memory efficiency through SGLs.

According to one aspect, the UCDMA system may classify I/O requests for processing to three or more memory allocation policies. Small I/O requests, including those equal to or less than 4 KB, may be processed according to a strategy using statically pinned memory 306. Small requests may be written to memory blocks 308 within the statically pinned memory 306. As described below in connection with FIG. 4, during the library initialization process, three memory block lists may be allocated and pinned, with users having the flexibility to set the block size based on their preferences. These memory block lists may remain pinned throughout the application's life cycle, according to one aspect. To optimize memory usage, the UCDMA system may dedicate one block list for reading requests and the remaining two block lists for writing requests, aligning with the fast reading and slow writing characteristics of NVMe SSDs. By maintaining a pinned memory state throughout the application's life cycle, the UCDMA system may avoid memory wastage and incur only a one-time pinning memory cost.

According to one aspect, medium data I/O requests, such as requests between 4 KB and 4 MB for example, may be processed using a pinned memory pool 310 along with allocation and release algorithms. Medium requests may be written to memory blocks 312 in the pinned memory pool. Memory blocks 312 themselves may be of different sizes. Unlike small and large I/O requests, the costs associated with copying and pinning memory for medium requests 312 are relatively higher. In contrast, conventional approaches may involve pinning memory of the corresponding size for each optimized data transfer DMA operation, leading to non-reusable pinned memory areas in I/O-intensive applications.

According to one aspect, in the case of large data I/O requests, such as those exceeding 4 MB, the UCDMA system may invoke a dynamically pinned memory policy. The system may create dynamically pinned memory 316 by allocating and pinning memory blocks from the pinned memory pool 310 to dynamic pinned memory blocks 318 during optimized data transfer UCDMA operations. The system may release the pinned memory block afterward. Unlike the UCDMA policy for smaller requests, large data requests occupy more memory, and prolonged occupation may adversely affect other processes. Additionally, the time spent in pinned memory is less than the time required for copying large data amounts, further justifying the use of dynamically allocated and pinned memory.

According to one aspect, once the incoming I/O requests are appropriately written to their respective memory pools, they may be destaged according to the policies and procedures of the SPDK. According to one aspect, the SPDK may direct a NVMe SSD driver 322 to write the requests to the NVMe SSD devices 324.

While the processing of the I/O requests described herein detail the classification of the requests according to certain request sizes, one skilled in the art will recognize that other size classifications may be implemented or set without deviating from the scope of the disclosure. According to one aspect, the request size to trigger writing the requests to the various memory pools described herein may be configured by a user or system administrator according to operations system needs.

Figure 4:
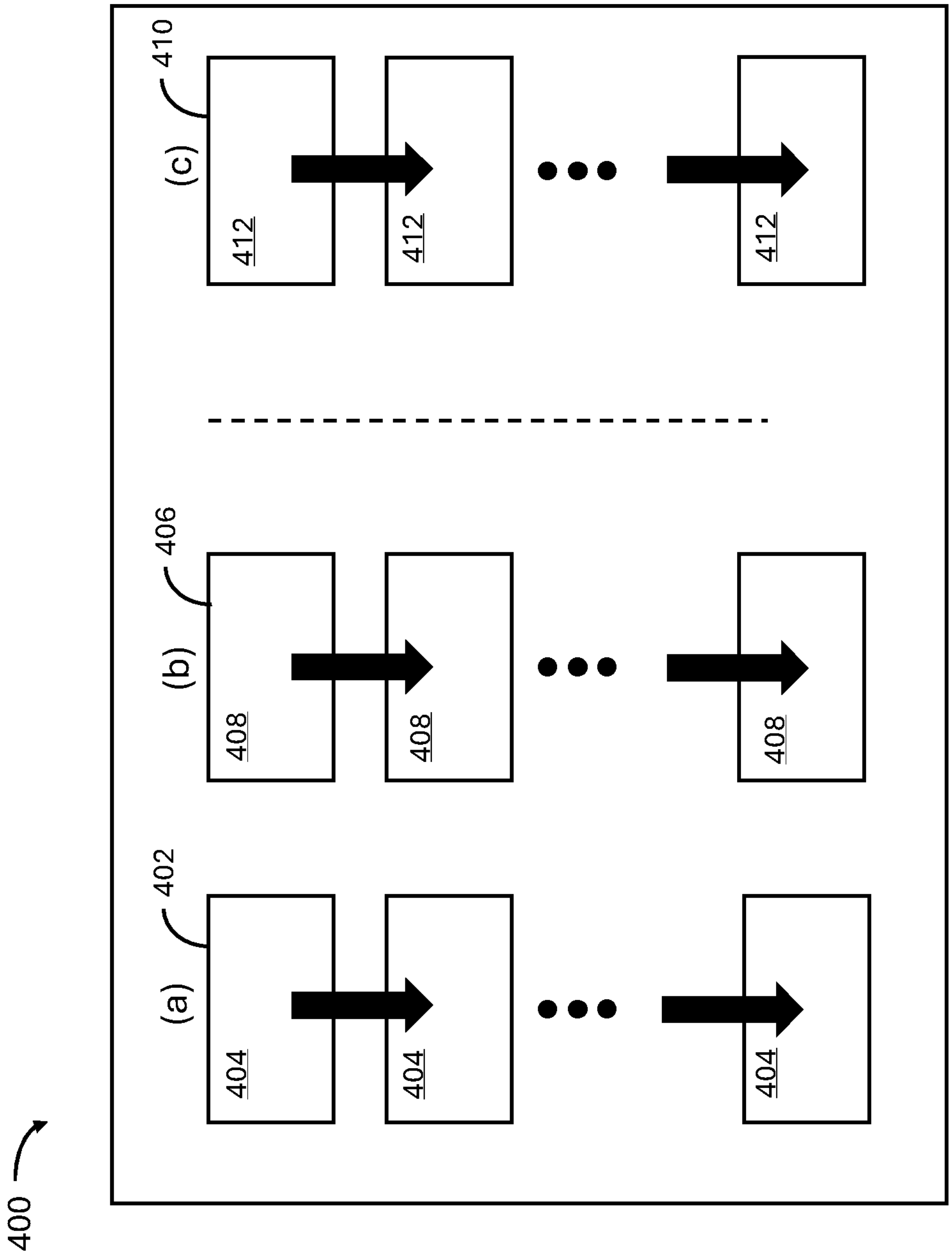
FIG. 4 is a block diagram of a framework of a statically managed pinned memory system, according to aspects of the present disclosure.

FIG. 4 is a block diagram of a framework 400 of a statically managed pinned memory system, like statically pinned memory 306 of FIG. 3, according to aspects of the present disclosure. The operational framework 400 of a managed statically pinned memory system may include three distinct memory block lists denoted as 402, 406, and 410. A first memory block list 402 and a second memory block list 406 may be dedicated to fulfilling writing requests for the NVMe SSD. The system may employ the two memory block lists 402, 406, including blocks 404, 408, for writing requests to account for a discrepancy between the reading and writing speeds of the NVMe SSD. Given the relatively slower writing speed, data in the memory block 404, 408 may take a considerable amount of time to be written to the NVMe SSD. When the first memory block list 402 reaches full capacity, it may be temporarily taken out of service, and the accumulated data may be written to the NVMe SSD in a batch process. Simultaneously, the second memory block list 406 may assume the responsibility of servicing writing requests. Once the second memory block list 406 is also full, the first memory block list 402 may become available again for use.

The third memory block list 410, including memory blocks 412, may be specifically allocated for reading requests. This allocation is based on the characteristic of the NVMe SSD, which exhibits faster reading speeds and slower writing speeds. Allocating a dedicated list of memory blocks, such as memory block list 410, for reading requests not only fulfills reading requirements but also optimizes the utilization of memory resources.

The implementation of the statically pinned memory into the memory block lists 402, 406, 410, as described herein, minimizes data transfer time. The system further conserves memory space with its use in handling small requests that only a limited number of fixed memory blocks are required to meet the specified requirements. The operational framework 400 also comprehensively considers the NVMe SSD's traits of fast reading and slow writing. Doing so ensures ample memory space is allocated for write requests, thereby enhancing the processing efficiency of write requests for NVMe SSDs.

Figure 5:
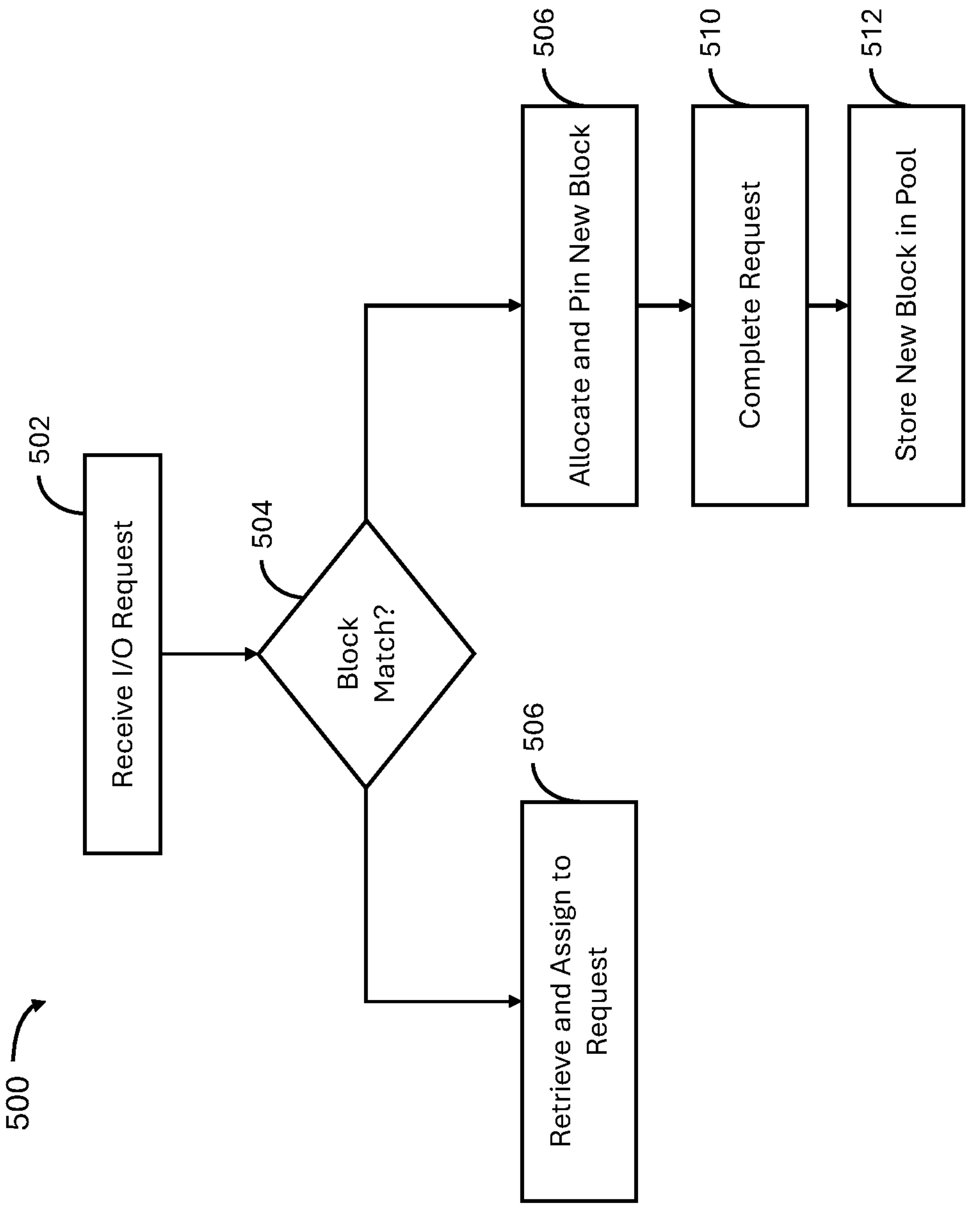
FIG. 5 is a flow diagram for a method of allocating pinned memory pool, according to aspects of the present disclosure.

FIG. 5 is a flow diagram for a method 500 for allocating a pinned memory pool, according to aspects of the present disclosure. The allocated pinned memory pool, like the pinned memory pool 310 of FIG. 3, may be configured for handling medium-sized data I/O requests, e.g., requests between 4 KB and 4 MB. As shown in block 502, upon the arrival of a new I/O request, the system may determine whether a matching memory block exists within the pinned memory pool to fulfill the specific requirements, shown in block 504. If a suitable block is found, as shown in block 506 it can be directly retrieved and assigned to the request. In cases where a matching block is absent, a new memory block is allocated and pinned, shown in block 506. Upon the completion of the I/O request, shown in block 510, the newly pinned memory block may be stored in the memory pool for subsequent I/O requests, as shown in block 512. According to one aspect, a pinned memory block management policy may implement a scatter/gather list (SGL) policy. Traditional DMA memory necessitates contiguity, resulting in suboptimal memory utilization. The UCDMA system described herein may utilize an SGL methodology to link discontinuous memory blocks, thereby enhancing the efficient utilization of pinned memory blocks.

According to one aspect, memory blocks may be dynamically allocated, pinned, and in some circumstances released, to process incoming I/O requests, including for example medium and large requests, as described herein. In other circumstances, as described herein, the system may not immediately release the pinned memory block after the request if completed. Instead, the system may recycle the used and pinned memory blocks into a designated pinned memory pool for systematic management. Algorithm 1, below, details the pinned memory pool allocation according to one aspect of the disclosure, where the input parameter may be the size of the pinned memory area required for allocation by the application. The algorithm's output may provide information about the first address within the memory area found in the pinned memory pool.

Algorithm 1: Pinned Memory Pool Allocation

```
Input: memory_size
Output: memory_address
1: if memory_pool is null then
2: memory_chunk←alloc_and_pin(pin_size)
3: add_memory_pool(memory_pool, memory_chunk)
4: memory_address←find_memory_region(memory_chunk)
5: update(memory_chunk)
6: return memory_address
7: else
8: for memory_chunk in memory_pool do
9: if mem_free_size(memory_chunk)>memory_size then
10: memory_address←find_memory_region(memory_chunk)
11: update(memory_chunk)
12: return memory_address
13: end if
14: end for
15: if total_memory_size+pin_size>total_pin_size then
16: return null
17: end if
18: memory_chunk←alloc_and_pin(pin_size)
19: memory_address←find_memory_region(memory_chunk)
20: add_memory_pool(memory_pool, memory_chunk)
21: update(memory_chunk)
22: return memory_address
23: end if
```

Algorithm 1 may address scenarios including the absence or emptiness of the pinned memory pool, insufficiency of available pinned memory to meet demand, and the availability of pinned memory that satisfies the demand.

According to a first scenario, in which the pinned memory pool is nonexistent or empty, the system may initialize the creation of a pinned memory pool when the system sets up a usage environment for the NVMe SSD (e.g., lines 1-6 of Algorithm 1). As the pinned memory pool is initially empty, the system may initiate the first access request to the NVMe SSD. Upon the system's first memory allocation request, a memory block may be allocated and pinned based on the user-configured block size. Subsequently, the system may place this memory block into an index for the next memory I/O request (e.g., line 3). The memory area may be marked as used, its metadata updated, and the first address of the memory area may be returned to the application. Once this pinned memory is fully utilized, its state may be changed to unused, and it may be managed using a linked list rather than being unpinned and released directly.

In a second scenario (e.g. insufficient pinned memory to meet demand) and a third scenario (e.g., the availability of pinned memory that satisfies the demand), the system may refrain from immediately asking for and pinning new memory blocks, as there may be existing blocks in the pool that satisfy the requirements. Instead, the system may first explore the pinned memory pool and retrieve information through the linked list index (e.g., lines 8-17 of Algorithm 1). The system may seek and identify a pinned memory block with the requirements of the memory pool. Furthermore, the system may implement a method for managing pinned memory blocks based on SGLs within a "find_memory_region" function. As described herein, the SGLs may enable the connection of discrete pinned memory blocks to form a larger block. If a sufficient number of blocks can fulfill the demand, the system may directly retrieve the corresponding memory from the memory pool, avoiding the need to allocate and pin a new memory block. Such an approach results in a savings in the time cost associated with pinning memory. If, however, a suitable difference is not found in pinned memory meeting the requirements, a new memory block may be allocated and pinned (e.g., lines 18-22 of Algorithm 1).

Conventional DMA mandates that memory blocks be contiguous. Therefore, if the available free memory blocks within the pinned memory pool are sufficiently large but not contiguous, utilizing such free memory becomes impractical. In such cases it may be necessary to allocate and pin new blocks of memory. This practice not only diminishes the effective utilization of memory blocks but also introduces additional I/O latency due to the allocation and pinning of fresh memory blocks. According to one aspect, as described herein, the system may use a pinned memory management approach grounded in SGLs. Such lists may seamlessly concatenate discontinuous memory blocks within the pinned memory pool, enabling their assignment for user-level DMA transfers.

According to one aspect, memory blocks in the pinned memory pool may be released. Algorithm 2, below, provides an exemplary mechanism for releasing memory blocks. The input to the algorithm may be the initial address of the pinned memory area intended for release by the application. The output may provide the status of the memory block, indicating the outcome of the release process for the system to assess.

Algorithm 2: Pinned Memory Pool Release

Input: memory_size

Output: status

1: memory_chunk←find_memory_chunk(memory_pool, memory_address)

2: if memory_chunk is null then

3: return status::error

4: end if

5: pin_memory_free(memory_chunk, memory_address)

6: update(memory_chunk)

7: mem_pre_region←chunk_pre_region(memory_chunk, memory_address)

8: mem_cur_region←memory_address

9: while memory_pre_region is free do

10: merge_free(memory_chunk, mem_pre_region, mem_cur_region)

11: mem_cur_region←mem_pre_region

12: mem_pre_region←chunk_pre_region(memory_chunk, mem_cur_region)

13: end while

14: mem_next_region←chunk_pre_region(memory_chunk, memory_address)

15: mem_cur_region←memory_address

16: while memory_next_region is free do

17: merge_free(memory_chunk, mem_next_region, mem_cur_region)

18: mem_cur_region←mem_next_region

19: mem_next_region←chunk_next_region(memory_chunk, mem_cur_region)

20: end while

21: if memory_chunk is free and memory_chunk_time_interval>time then

22: delete_memory_chunk(memory_pool, memory_chunk)

23: free_and_unpin(memory_chunk)

24: end if

25: return status::ok

The system may determine whether a memory address is not present in the pinned memory pool (e.g., lines 2-4 of Algorithm 2). If the memory address is not present in the pinned memory pool, an error is returned. According to one aspect, the system may traverse the linked list of pinned memory blocks to determine the existence of contiguous, mergeable memory blocks (e.g., lines 9-20 of Algorithm 2). Merging these blocks may ensure that the memory space is consolidated both before and after, preventing fragmentation during the release process. Upon identifying mergeable blocks, those blocks may be combined to form a larger, contiguous pinned memory space, subsequently marked as free. In the absence of such mergeable blocks, the system may directly mark the blocks as free. Following the completion of the marking process for the releasable memory blocks (e.g., lines 21-24 of Algorithm 2), the system may assess whether a new timestamp for these blocks surpasses a user-set threshold. According to one aspect, only those memory blocks exceeding the specified threshold may be released.

According to one aspect, the UCDMA system described herein may define, set, and implement various parameters, including for example, a size of the pinned memory block for each application (e.g., 'm'), a total size of the memory cache (global memory) area (e.g., 'M'), and a time threshold for memory block inactivity (e.g., 't'). The choice of 'm' may be tailored to the characteristics of the system or application load or determined empirically. According to one aspect, a default value for 'm' may be set at 4 MB. Adjustments to the pinned memory block size may be made based on the application's memory block usage over a certain duration. According to one aspect, after the system has run for some time, an assessment of the current application's memory usage may inform appropriate adjustments to enhance performance.

According to one aspect, setting 'M' may not follow a specific policy, as a larger value may contribute to improved concurrency in processing I/O requests. However, 'M' should be reasonably configured based on different scenarios. For instance, on a server exclusively dedicated to disk I/O with no other applications running, users may set a substantial value to enhance I/O request processing efficiency. In such a scenario, the user might allocate a significant portion of the server's memory to the memory cache area to maximize the server's I/O performance. For example, a user may set a value for 'M' on a server by determining the available memory considering the total physical memory available on the server. For instance, the server may have 64 GB of RAM available. A portion may be allocated for the memory cache area using a substantial portion of the total memory to the memory cache area. For example, 32 GB out of the 64 GB of RAM to the memory cache area may be allocated as a substantial amount. The size of 'M' may be adjusted based on server usage over time.

A guiding principle, according to one aspect, may be to establish a significant threshold without disrupting the operation of other applications.

According to one aspect, the parameter ‘t’ may be primarily intended to release entirely free memory blocks and reduce memory space occupation during periods of reduced I/O processing. The value of ‘t’ may be practical and closely tied to the system environment. If it is excessively large, some memory may remain pinned for an extended period without utilization, leading to a waste of memory resources. Conversely, if ‘t’ is too small, it may result in frequent memory allocation and pinning. A typical value for ‘t’ may be in the range of a few minutes to an hour (e.g., 5 minutes, 15 minutes, 30 minutes, or 1 hour), depending on the application’s usage patterns and the I/O processing load.

To determine an appropriate value for ‘t’, usage may be monitored by examining how often memory blocks are being accessed and how long they remain idle. If many blocks are not being used for extended periods (e.g., more than 30 minutes), a lower value for “t” (e.g., 15 minutes) may be set to release them sooner. If the application requires consistent memory availability for sustained I/O operations, a larger value for ‘t’ may be set to maintain the pinned memory for a longer time. Performance and resource usage may be monitored over time and the value of ‘t’ may be adjusted if necessary to optimize memory usage. By monitoring the system and adjusting the value of ‘t’ based on the application’s requirements and memory usage patterns, the right balance to optimize system performance and resource utilization may be found.

Figure 6:
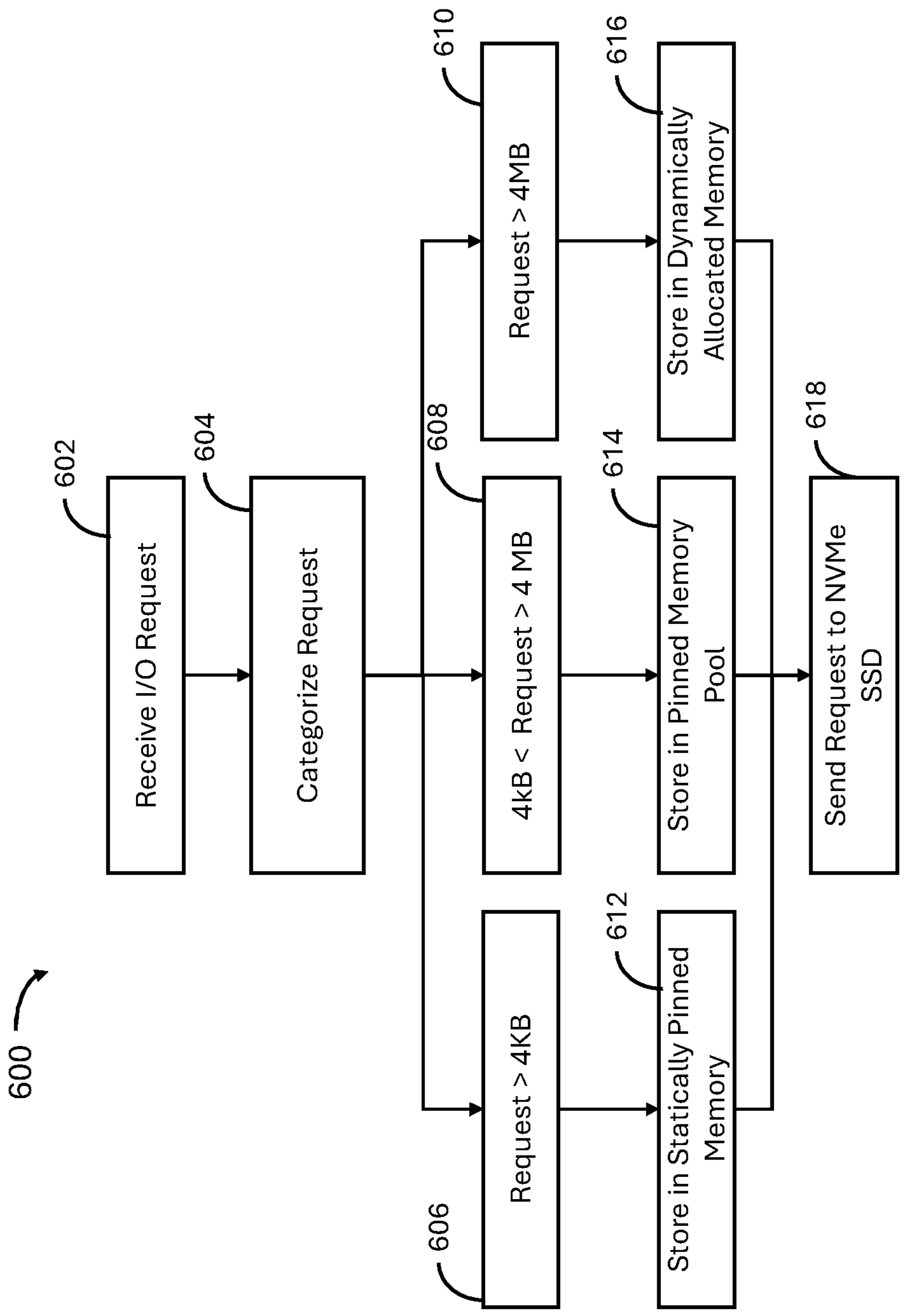
FIG. 6 is a flow diagram of a method for storing an input/output request, according to aspects of the present disclosure.

FIG. 6 is a flow diagram of a method 600 for storing an input/output request, according to aspects of the present disclosure. As shown in block 602 and described herein, one or more I/O requests may be received to a system or application. The UCDMA system may categorize the request according to a number of classifications and parameters. According to one aspect, the request may be categorized according to the size of the I/O request. A first classification, shown in block 606, may include requests less than 4 KB. A second classification, shown in block 608, may include requests greater than or equal to 4 KB and less than or equal to 4 MB. A third classification, shown in block 610, may include requests greater than 4 MB.

If the request is less than 4 KB, the request may be stored in a statically pinned memory, as shown in block 612. If the request is greater than or equal to 4 KB and less than or equal to 4 MB, as shown in block 614, the request may be stored in a pinned memory pool. As shown in block 616, if the request is greater than 4 MB, the request may be stored in dynamically allocated memory as described herein. Requests, once initially processed and written to cache, may be destaged to long term storage accordingly, such as a NVMe SSD device.

Figure 7:
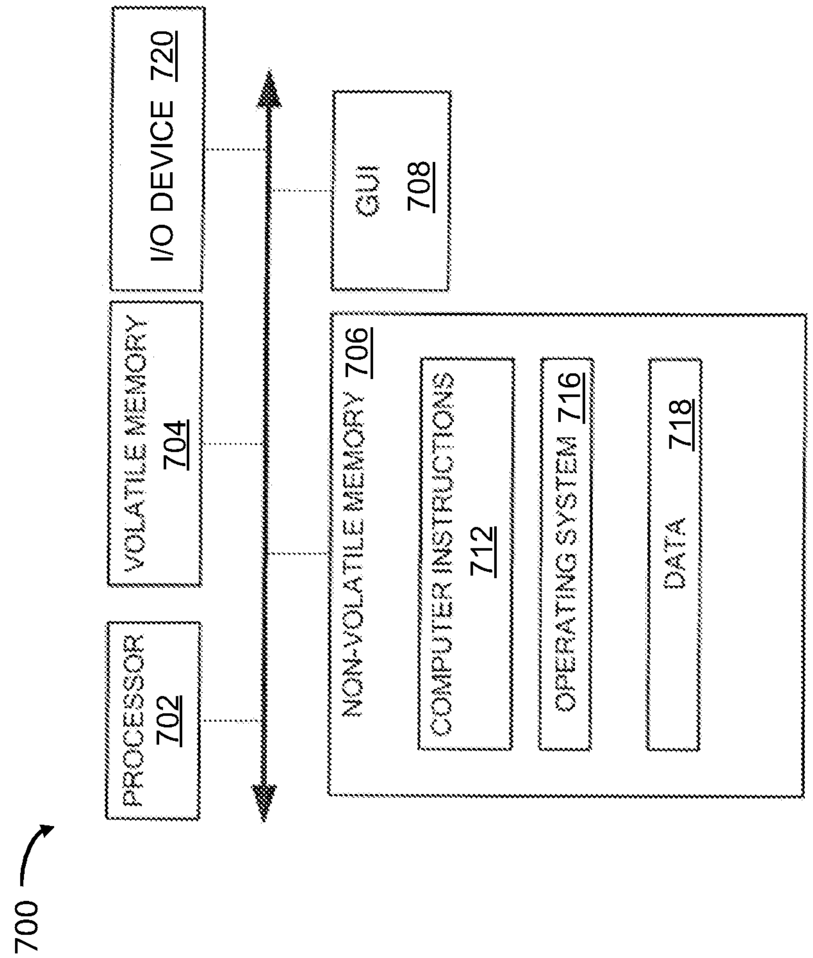
FIG. 7 is a diagram of an example of a computing device, according to aspects of the disclosure.

Referring to FIG. 7, in some embodiments, a computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some aspects or embodiments, the term “I/O request” or simply “I/O” may be used to refer to an input or output request. In some embodiments, an I/O request may refer to a data read or write request. At least some of the steps discussed with respect to FIGS. 1-7 may be performed in parallel, in a different order, or altogether omitted. As used in this application, the word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion.

Additionally, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word “about”, “substantially” or “approximately” preceded the value of the value or range.

Moreover, the terms “system,” “component,” “module,” “interface,”, “model” or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:

receiving an input/output (I/O) request, wherein the I/O request comprises a direct memory access (DMA) operation;

categorizing the I/O request according to a request size classification;

storing the I/O request to a pre-allocated statically pinned memory if the I/O request is categorized into a first classification;

storing the I/O request in a pinned memory pool if the I/O request is categorized into a second classification, wherein storing the I/O request in the pinned memory pool comprises using a scatter/gather list with non-contiguous data buffers; and storing the I/O request in a dynamically allocated memory, if the I/O request is categorized into a third classification, wherein the pre-allocated statically pinned memory, the pinned memory pool, and the dynamically allocated memory comprise respective regions of volatile system memory accessible to a DMA engine and used to store data for performing the DMA operation.

2. The method of claim 1 wherein the first classification includes a first request size, the second classification includes a second request size, and the third classification comprises a third request size.

3. The method of claim 2 wherein the first request size comprises less than four kilobytes.

4. The method of claim 3 wherein the second request size comprises greater than four kilobytes and less than four megabytes.

5. The method of claim 4 wherein the third request size comprises greater than four megabytes.

6. The method of claim 1 further comprising designating at least one block list in the statically pinned memory for I/O read requests.

7. The method of claim 6 further comprising designating at least two block lists in the statically pinned memory for I/O write requests.

8. The method of claim 7 further comprising storing the I/O write requests in a first of the at least two block lists in the pre-allocated statically pinned memory until a first capacity is reached and storing the I/O write requests in a second of the at least two block lists in the pre-allocated statically pinned memory after the first capacity is reached.

9. The method of claim 1 further comprising releasing pinned memory blocks in the dynamically allocated memory upon completion of the I/O request.

10. A system comprising:

a memory; and at least one processor that is operatively coupled to the memory, the at least one processor being configured to perform the operations of:

receiving an input/output (I/O) request, wherein the I/O request comprises a direct memory access (DMA) operation;

categorizing the I/O request according to a request size classification;

storing the I/O request to a pre-allocated statically pinned memory if the I/O request is categorized into a first classification;

storing the I/O request in a pinned memory pool if the I/O request is categorized into a second classification, wherein storing the I/O request in the pinned memory pool comprises using a scatter/gather list with non-contiguous data buffers; and storing the I/O request in a dynamically allocated memory, if the I/O request is categorized into a third classification, wherein the pre-allocated statically pinned memory, the pinned memory pool, and the dynamically allocated memory comprise respective regions of volatile system memory accessible to a DMA engine and used to store data for performing the DMA operation.

11. The system of claim 10 wherein the first classification includes a first request size, the second classification includes a second request size, and the third classification comprises a third request size.

12. The system of claim 11 wherein the first request size comprises less than four kilobytes, the second request size comprises greater than four kilobytes and less than four megabytes, and the third request size comprises greater than four megabytes.

13. The system of claim 10 further comprising designating at least one block list in the statically pinned memory for I/O read requests.

14. The system of claim 13 further comprising:

designating at least two block lists in the pre-allocated statically pinned memory for I/O write requests; and storing the I/O write requests in a first of the at least two block lists in the pre-allocated statically pinned memory until a first capacity is reached and storing the I/O write requests in a second of the at least two block lists in the pre-allocated statically pinned memory after the first capacity is reached.

15. The system of claim 10 further comprising releasing pinned memory blocks in the dynamically allocated memory upon completion of the I/O request.

16. A non-transitory computer-readable medium storing one or more processor-executable instructions, which when executed by at least one processor cause the at least one processor to perform the operations of:

receiving an input/output (I/O) request, wherein the I/O request comprises a direct memory access (DMA) operation;

categorizing the I/O request according to a request size classification;

storing the I/O request to a pre-allocated statically pinned memory if the I/O request is categorized into a first classification;

storing the I/O request in a pinned memory pool if the I/O request is categorized into a second classification, wherein storing the I/O request in the pinned memory pool comprises using a scatter/gather list with non-contiguous data buffers; and storing the I/O request in a dynamically allocated memory, if the I/O request is categorized into a third classification, wherein the pre-allocated statically pinned memory, the pinned memory pool, and the dynamically allocated memory comprise respective regions of volatile system memory accessible to a DMA engine and used to store data for performing the DMA operation.

* * * * *